July 1, 1924.

W. C. BELL 1,499,964

PISTON UNIT

Filed June 19, 1923    2 Sheets-Sheet 1

INVENTOR.
W. C. Bell,
BY
Geo. P. Kimmel
ATTORNEY.

July 1, 1924.

W. C. BELL 1,499,964

PISTON UNIT

Filed June 19, 1923

INVENTOR.
W. C. Bell,
BY
Geo. Kimmel
ATTORNEY.

Patented July 1, 1924.

1,499,964

UNITED STATES PATENT OFFICE.

WILLIAM CRAWFORD BELL, OF BALTIMORE, MARYLAND.

PISTON UNIT.

Application filed June 19, 1923. Serial No. 646,396.

*To all whom it may concern:*

Be it known that I, WILLIAM CRAWFORD BELL, a subject of the King of Great Britain, residing at Baltimore, in the State of Maryland, have invented certain new and useful Improvements in Piston Units, of which the following is a specification.

This invention relates to certain new and useful improvements in piston units designed primarily for use in connection with internal combustion engines, but it is to be understood that a piston unit in accordance with this invention, can be employed for any purposes wherein it is found applicable, and the invention has for its object to provide, in a manner as hereinafter set forth, a novel form of piston unit whereby the piston thereof will automatically aline itself within the cylinder of the engine.

A further object of the engine is to provide, in a manner as hereinafter set forth, a piston unit, for eliminating all undue wear and tear upon the piston and cylinder of an engine by providing for the perfect alinement of the piston with respect to the cylinder during the operation of the engine.

A further object of the invention is to provide, in a manner as hereinafter set forth, a piston unit embodying a novel form of piston connecting rod union, the said union having a relatively large bearing area, whereby the usual wear and tear thereon is reduced to an absolute minimum and the life and general efficiency of the general operation of the engine is correspondingly increased.

A further object of the invention is to provide, in a manner as hereinafter set forth, a piston unit having an inherent alining characteristic, whereby the piston will automatically aline itself within the cylinder of the engine, under such conditions reducing wear to a minimum.

Further objects of the invention are to provide a piston unit, in a manner as hereinafter referred to, and which is simple in its construction and arrangement, strong, durable, compact, thoroughly efficient in its use, readily assembled and comparatively inexpensive to set up.

With the foregoing and other objects in view, the invention consists in the novel construction, combination and arrangement of parts as hereinafter more specifically described and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1:
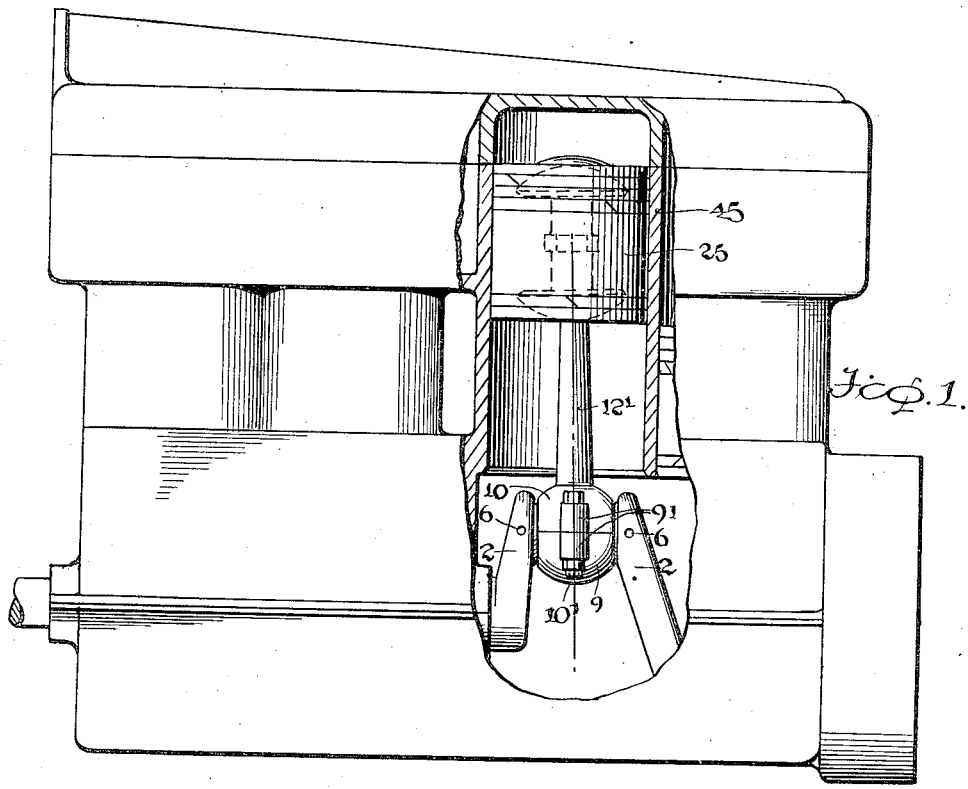
Figure 1 is an elevation of an engine, partly in section, showing the adaptation therewith of a piston unit in accordance with this invention.
Figure 4:
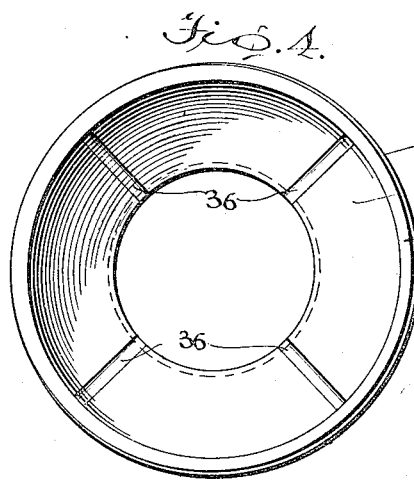
Fig. 4 is a plan view of the combined coupling and bearing annulus.
Figure 5:
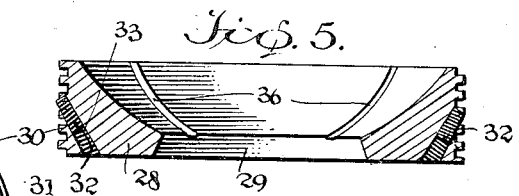
Fig. 5 is a cross sectional view of the annulus.
Figure 6:
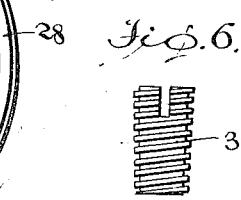
Fig. 6 is a detail illustrating the securing elements for the combined coupling and bearing annulus.
Figure 7:
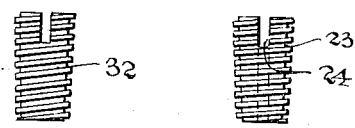
Fig. 7 is a detail illustrating the securing element for the bearing head.

Referring to the drawings in detail, 1 denotes the spherical journaled portion formed medially of the crank portion 2 of an engine shaft 3. The journal 1 of the crank portion 2 of the engine shaft 3 has the same form as the spherical socket 12 of the connecting rod and said spherical socket and connecting rod will be presently referred to. The crank portion 2 has arranged at each side of the journal portion 1 conoidal-shaped shoulders 4 and the said shoulders 4 are oppositely disposed with respect to each other. Formed interiorly of the journal 1, and on the longitudinal center thereof, is a cavity or duct 5 which connects at its opposite end two passages or ducts 6, opening outwardly of the crank portion 2, to receive therethrough a supply of oil from the body of oil usually placed within the crank case of an engine for the purpose of being splashed onto all interior moving parts of the latter by the turning movements of the crank portion 2 of the shaft 3. Formed radially of the journal 1 is a canal or duct 7 connecting with the cavity or duct 5 at the center thereof, whereby oil is led therefrom to the bearing surfaces of the socket in general.

The opposite edges or ends of the socket 12 are provided with conoidal surfaces 8 which oppose the shoulders 4. The socket 12 is formed by a pair of semi-spherical members 9 and 10. The member 10 is formed integral with the connecting rod 11, and said members 9 and 10 are detachably connected together by the hold-fast devices 10′. Alining apertured ears 9′ are integral with the members 9 and 10, and through said alining ears extend the hold fast devices 10′.

The connecting rod 11 is of tapering contour for a portion of its length, as indicated at 12′, and the remaining portion of the rod is cylindrical, as indicated at 13, and peripherally threaded at said cylindrical portion as at 14. That end of the rod 11 opposite the end provided with the member 10 is formed with a socket 15 having the wall thereof threaded and said rod 11, from that end provided with the member 10 to the socket 15, is axially bored as at 16. That end of the rod 11 provided with the socket 15 is split as at 17.

Mounted on and engaging with the threaded cylindrical portion 13 of the rod 11 is a substantially spherical bearing head, referred to generally by the reference character 18, and which comprises an interiorly threaded cylindrical sleeve 19 having a spherical enlargement 20 at one end and a spherical enlargement 21 at the other end. The sleeve 19, intermediate its ends, is formed with a polygonal boss or collar 22 to facilitate the engagement of a tool with the sleeve 19 for the purpose of securing it on or removing it from the rod 11. The head 18 is of the same length as the cylindrical portion 13 of the rod 11, and although the sleeve 19 is interiorly threaded and engages with the peripheral threads 14 of the rod 11, yet an additional means is provided for the purpose of further securing the head 18 with the rod 11, and said means comprises a tapering machine screw 23 which engages in the socket 15 and forces the split end 17 of the rod 11 apart, whereby a binding action is set up between the split end of the rod 11 and one end of the sleeve 19. The screw 23 has an axial bore 24 which registers with the bore 16 of the rod 11.

The enlargements 20 and 21, at the ends of the sleeve 19, provide oppositely disposed convex segments of a sphere and the exterior surfaces thereof form spherical bearing surfaces for the head 18 when engaged within a substantially spherical bearing socket formed interiorly of the piston. The body portion of the piston is indicated at 25 and which is cylindrical in contour, open at one end and closed at its other end and said closed end constitutes the head 26 of the piston and which has its inner face formed with a semispherical socket 27. Secured within the open end of the body 25 is a combined coupling and bearing annulus which is formed of a body portion 28 having a bevelled inner edge 29 and a peripherally threaded outer edge 30 which has threaded engagement with the inner face of the body portion 25, whereby said annulus is connected with the piston. The inner face of the body portion 28 of the annulus is set up to form a semi-spherical socket 31 which is oppositely disposed with respect to the semispherical socket 27 and the said sockets 27 and 31 provide, when the bearing head 18 is coupled with the piston, a substantially spherical socket. The enlargement 20 of the bearing head 18, when the latter is connected with the piston, is mounted in the socket 27 and the enlargement 21 is mounted in the socket 31.

The body portion 28 of the combined coupling and bearing annulus is also secured with the body portion 25 of the piston through the medium of retaining elements, such as machine screws 32, which engage in inclined openings 33 formed in the body portion 28 and bear against the screw threaded portion formed interiorly of the body 25 of the piston.

Opening outwardly through the enlarged portion 21 of the bearing head are ducts 34, to provide vents or exits for any excess of grease or oil which may accumulate within the piston.

The wall of the socket 27 is formed with grooves 35 for conducting lubricant, and the wall of the socket 31 is also provided with lubricant conducting grooves 36.

Figure 2:
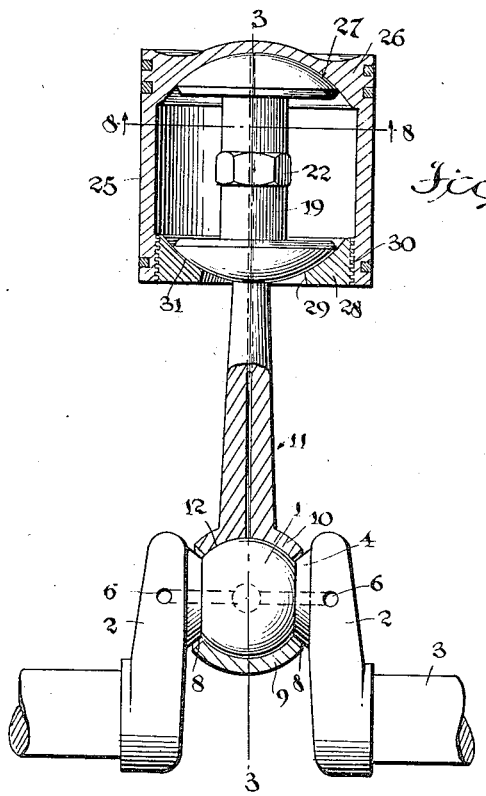
Fig. 2 is a sectional elevation of a piston unit in accordance with this invention.
Figure 9:
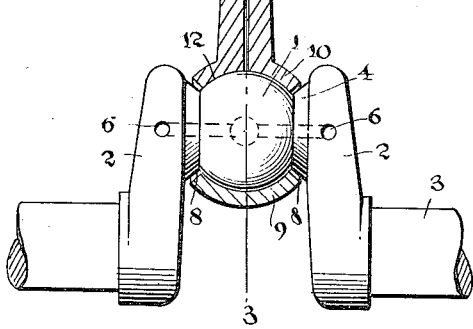
Fig. 9 is a vertical sectional view of a modified form.
Figure 9:
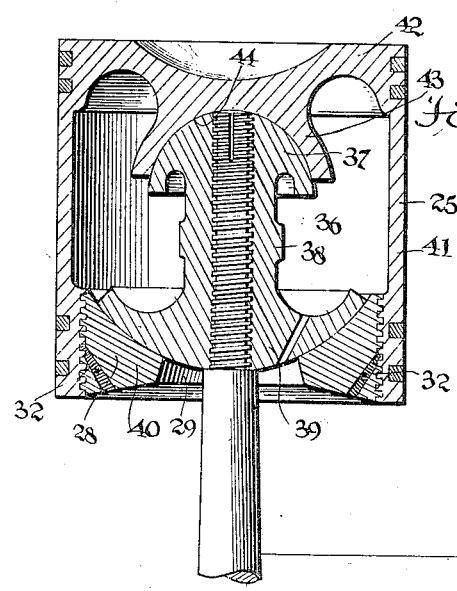
Figure 8:
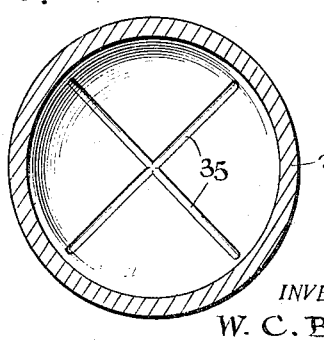
Fig. 8 is a section on line 8—8 of Fig. 2.

The construction shown in Fig. 9 is virtually the same as that shown in Fig. 2. In this modified construction the bearing head, which is indicated generally by the reference character 36′ is set up with the enlargement 37 at one end of the sleeve 38 of less diameter than the enlargement 39 at the other end of the sleeve. The enlargement of greater diameter is mounted in the socket formed by the combined coupling and bearing annulus 40 which is secured within the body portion 41 of the piston at the open end thereof. The enlargement 39 is upon a greater arc than the enlargement 37 and owing to the setting up of the enlargement 37 of less diameter than the enlargement 39, the head 42 of the piston is provided with an inwardly formed socket 44 which is of materially less diameter than the socket formed by the annulus 40 and of the necessary diameter to receive the enlargement 37.

Figure 3:
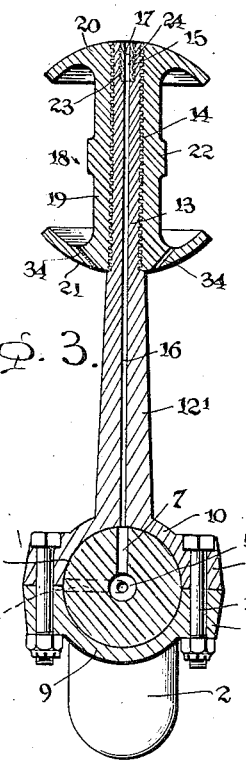
Fig. 3 is a section on line 3—3 of Fig. 2.

The center of the sphere of which the enlargement 20 or 37 is a segment, as shown by Figs. 2, 3 and 9, is also the center of the sphere of which the enlargement 21 or 39 is a segment. Similarly the center of the sphere of which one socket is a segment is also the center of the sphere of which the opposed socket is a segment. From the foregoing it will be readily apparent that as the piston socket and bearing head constitute a substantially universal or multi-axis union, by means whereof the piston is mounted upon the connecting rod, means are thereby established to provide for the usual oscillating movements of the connecting rod effected by the successive strokes of the piston within the cylinder 45 and by the consequent and successive revolutions of the crank shaft 3. Likewise it will be equally obvious that the said means further provide for lateral or other oscillating movements of the connecting rod occasioned by any inaccuracy in the alinement of the cylinder with respect to the crank shaft, or by any lateral movement or position of the crank shaft with respect to the cylinder.

It is to be noted that the improved type of piston unit, together with the novel manner in which the same is mounted upon the connecting rod, permits of the self alining of the piston within the cylinder at all times and avoids the hazard of any inaccuracy in the alinement of the piston with respect to the connecting rod consequent to the usual method of mounting the former upon the latter. It is also to be noted that the improved form of piston unit likewise permits of the self alining of the piston within the cylinder in a manner to compensate for any inaccuracy in the alinement of the connecting rod occasioned by the bending or the springing thereof. It is to be further noted that the improved form of piston unit embodies a piston-connecting rod union of the ball and socket principle and one having comparatively large bearing surfaces whereby the stress of a given area thereon is correspondingly reduced, while the said form of piston unit, by permitting the providing of a novel and efficient means of lubricating the said bearing surfaces thereof, further reduces the wear and tear thereon to an absolute minimum and the life and general efficiency of the general operation of the said piston unit is thereby correspondingly increased.

Although the drawings, in connection with the description, set up the preferred embodiment of the invention yet it is to be understood that changes can be had which will fall within the light of the invention as claimed.

What I claim is:—

1. A piston unit comprising a piston body having means to provide therein at each end thereof a semi-spherical socket, said sockets being oppositely disposed, a connecting rod extending through one of said sockets and into said piston body, and a sleeve secured to that end of the connecting rod within the piston body and provided at each end with a semi-spherical enlargement constituting a bearing seated in one of said sockets.

2. A piston unit comprising a piston body having means to provide therein at each end thereof a semi-spherical socket, said sockets being oppositely disposed, a connecting rod extending through one of said sockets and into said piston body, a sleeve secured to that end of the connecting rod within the piston body and provided at each end with a semi-spherical enlargement constituting a bearing seated in one of said sockets, the means to provide the socket through which extends said rod being detachably secured within the piston body.

3. A piston unit comprising a piston body having means to provide therein at each end thereof a semi-spherical socket, said sockets being oppositely disposed, a connecting rod extending through one of said sockets and into said piston body, and a sleeve secured to that end of the connecting rod within the piston body and provided at each end with a semi-spherical enlargement constituting a bearing seated in one of said sockets, the wall of each of said sockets being grooved, and that enlargement seated in the socket through which extends the connecting rod being provided with ducts.

4. A piston unit comprising a piston body having means to provide therein at each end thereof a semi-spherical socket, said sockets being oppositely disposed, a connecting rod extending through one of said sockets and into said piston body, a sleeve secured to that end of the connecting rod within the piston body and provided at each end with a semi-spherical enlargement constituting a bearing seated in one of said sockets, the means to provide the socket through which extends said rod being detachably secured within the piston body, the walls of each of said sockets being grooved, and that enlargement seated in the socket through which extends the connecting rod being provided with ducts.

5. A piston unit comprising a piston body having means to provide therein at each end thereof a semi-spherical socket, said sockets being oppositely disposed, a connecting rod extending through one of said sockets and into said piston body, a sleeve secured to that end of the connecting rod within the piston body and provided at each end with a semi-spherical enlargement constituting a bearing seated in one of said sockets, the means to provide the socket through which extends said rod having threaded engagement with the piston body and further having retaining elements extending therethrough and engaging with the piston body.

6. A piston unit comprising a piston body having means to provide therein at each end thereof a semi-spherical socket, said sockets being oppositely disposed, a connecting rod extending through one of said sockets and into said piston body, a sleeve secured to that end of the connecting rod within the piston body and provided at each end with a semi-spherical enlargement constituting a bearing seated in one of said sockets, the means to provide the socket through which extends said rod having threaded engagement with the piston body and further having retaining elements extending therethrough and engaging with the piston body, the walls of each of said sockets being grooved, and that enlargement seated in the socket through which extends the connecting rod being provided with ducts.

7. A piston unit comprising a piston body provided interiorly with spaced semi-spherical socket forming means, a connecting rod extending into said piston body and having a peripherally threaded portion formed with a socket, a sleeve having threaded engagement with the threaded portion of said rod and provided at each end with a semi-spherical enlargement, said enlargements constituting bearings and seated in said spaced semi-spherical socket forming means, and a retaining element for said sleeve engaging in the socket of the rod.

8. A piston unit comprising a piston body provided interiorly with spaced semi-spherical socket forming means, a connecting rod extending into said piston body and having a peripherally threaded portion formed with a socket, a sleeve having threaded engagement with the threaded portion of said rod and provided at each end with a semi-spherical enlargement, said enlargements constituting bearings and seated in said spaced semi-spherical socket forming means, and a retaining element for said sleeve engaging in the socket of the rod, said rod having a lubricant conducting passage opening into the piston body, said spaced semi-spherical socket forming means being grooved and with the grooves opposing said enlargements, and said enlargement at the outer end of said sleeve formed with ducts extending therethrough.

9. A piston unit comprising a piston body having an integral portion at one end formed to provide a semi-spherical socket and a detachable portion at its other end formed to provide a semi-spherical socket, a connecting rod extending through said detachable portion into said piston body, and a sleeve carried by the connecting rod within said piston body and provided at each end with a semi-spherical enlargement, said enlargements constituting bearings seated in said sockets, and the detachable portion providing means for connecting the rod with the piston body.

10. A piston unit comprising a piston body having an integral portion at one end formed to provide a semi-spherical socket and a detachable portion at its other end formed to provide a semi-spherical socket, a connecting rod extending through said detachable portion into said piston body, a sleeve carried by the connecting rod within said piston body and provided at each end with a semi-spherical enlargement, said enlargement constituting bearings seated in said sockets, and the detachable portion providing means for connecting the rod with the piston body, and retaining elements extending through said detachable portion and engaging with the piston body for securing it in position.

11. A piston unit comprising a piston body having an integral portion at one end formed to provide a semi-spherical socket and a detachable portion at its other end formed to provide a semi-spherical socket, a connecting rod extending through said detachable portion into said piston body, and a sleeve carried by the connecting rod within said piston body and provided at each end with a semi-spherical enlargement, said enlargements constituting bearings seated in said sockets, the detachable portion providing means for connecting the rod with the piston body, and that enlargement seated in said detachable portion provided with ducts extending therethrough.

12. A piston unit comprising a piston body having an integral portion at one end formed to provide a semi-spherical socket and a detachable portion at its other end formed to provide a semi-spherical socket, a connecting rod extending through said detachable portion into said piston body, a sleeve carried by the connecting rod within said piston body and provided at each end with a semi-spherical enlargement, said enlargements constituting bearings seated in said sockets, and the detachable portion providing means for connecting the rod with the piston body, and retaining elements extending through said detachable portion and engaging with the piston body for securing it in position, and that enlargement seated in said detachable portion provided with ducts extending therethrough.

In testimony whereof, I affix my signature hereto.

WILLIAM CRAWFORD BELL.